US009430960B2

(12) United States Patent
Choi et al.

(10) Patent No.: US 9,430,960 B2
(45) Date of Patent: Aug. 30, 2016

(54) DISPLAY DEVICE AND DRIVING METHOD THEREOF

(71) Applicant: Samsung Display Co., Ltd., Yongin, Gyeonggi-Do (KR)

(72) Inventors: Jae-Suk Choi, Uuijeongbu-si (KR); Hoi Sik Moon, Asan-si (KR); Gwang Ho Nam, Asan-si (KR); Chang-Soo Lee, Cheonan-si (KR); Min-Yup Chae, Cheonan-si (KR); Hak-Mo Choi, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 251 days.

(21) Appl. No.: 14/148,501

(22) Filed: Jan. 6, 2014

(65) Prior Publication Data

US 2015/0009188 A1 Jan. 8, 2015

(30) Foreign Application Priority Data

Jul. 8, 2013 (KR) ........................ 10-2013-0079953

(51) Int. Cl.
*G06F 3/038* (2013.01)
*G09G 3/20* (2006.01)
*G09G 3/36* (2006.01)

(52) U.S. Cl.
CPC .............. *G09G 3/20* (2013.01); *G09G 3/3614* (2013.01); *G09G 2320/0209* (2013.01); *G09G 2320/0219* (2013.01); *G09G 2320/0223* (2013.01); *G09G 2320/0233* (2013.01); *G09G 2320/0257* (2013.01); *G09G 2320/0285* (2013.01)

(58) Field of Classification Search
CPC .................. G09G 3/3648; G09G 2320/0252; G09G 5/06; G09G 2340/16; G09G 3/3611; H04N 1/6027
USPC .................................................. 345/204–215
See application file for complete search history.

(56) References Cited

U.S. PATENT DOCUMENTS

| | | | |
|---|---|---|---|
| 6,747,621 | B2 | 6/2004 | Miyake |
| 6,833,886 | B2 | 12/2004 | Suzuki et al. |
| 7,312,777 | B2 | 12/2007 | Miyata et al. |
| 7,522,140 | B2 | 4/2009 | Jinda et al. |
| 7,642,999 | B2 | 1/2010 | Oura |

(Continued)

FOREIGN PATENT DOCUMENTS

| | | | |
|---|---|---|---|
| JP | 2008-046186 | A | 2/2008 |
| KR | 10-2008-0022689 | A | 3/2008 |

(Continued)

*Primary Examiner* — Aneeta Yodichkas
*Assistant Examiner* — Gerald Oliver
(74) *Attorney, Agent, or Firm* — Knobbe, Martens, Olson & Bear, LLP

(57) ABSTRACT

A display device and a driving method thereof are disclosed. In one aspect, the display device includes a display panel including a plurality of pixels, a data driver transferring data voltages to a plurality of data lines, and a gate driver transferring gate signals to a plurality of gate lines. The display device also includes a signal controller controlling the data driver and the gate driver and including a signal processor. The signal processor includes a memory and a coupling index calculator calculating a coupling index which represents a coupling degree between adjacent rows. The signal processor compensates for the input image signal to generate a compensated image signal based at least in part on the coupling index.

18 Claims, 15 Drawing Sheets

(56) References Cited

U.S. PATENT DOCUMENTS

| | | | | |
|---|---|---|---|---|
| 2002/0012126 | A1* | 1/2002 | Nakamura | H04N 1/4072 358/1.9 |
| 2009/0009508 | A1* | 1/2009 | Koo | H04N 13/0454 345/214 |
| 2009/0085856 | A1 | 4/2009 | Okada et al. | |
| 2010/0165222 | A1 | 7/2010 | Choi | |
| 2011/0175954 | A1 | 7/2011 | Lee et al. | |
| 2011/0261029 | A1* | 10/2011 | Moon | G02B 27/2264 345/204 |
| 2011/0279466 | A1 | 11/2011 | Park et al. | |
| 2012/0249620 | A1* | 10/2012 | Choi | G09G 3/3688 345/694 |

FOREIGN PATENT DOCUMENTS

| | | | |
|---|---|---|---|
| KR | 10-0840324 | B1 | 6/2008 |
| KR | 10-1032437 | B1 | 4/2011 |

* cited by examiner

FIG.5

LUT_P

<table>
<tr><th>N \ N-1</th><th>0</th><th>16</th><th>32</th><th>48</th><th>64</th><th>80</th><th>96</th><th>112</th><th>128</th><th>144</th><th>160</th><th>176</th><th>192</th><th>208</th><th>224</th><th>240</th><th>256</th></tr>
<tr><td>0</td><td colspan="17" rowspan="16">Compensation value</td></tr>
<tr><td>16</td></tr>
<tr><td>32</td></tr>
<tr><td>48</td></tr>
<tr><td>64</td></tr>
<tr><td>80</td></tr>
<tr><td>96</td></tr>
<tr><td>102</td></tr>
<tr><td>128</td></tr>
<tr><td>144</td></tr>
<tr><td>160</td></tr>
<tr><td>176</td></tr>
<tr><td>192</td></tr>
<tr><td>208</td></tr>
<tr><td>224</td></tr>
<tr><td>240</td></tr>
<tr><td>255</td></tr>
</table>

FIG.6

LUT_N

| N \ N+1 | 0 | 16 | 32 | 48 | 64 | 80 | 96 | 112 | 128 | 144 | 160 | 176 | 192 | 208 | 224 | 240 | 256 |
|---|---|---|---|---|---|---|---|---|---|---|---|---|---|---|---|---|---|
| 0 | Compensation value | | | | | | | | | | | | | | | | |
| 16 | | | | | | | | | | | | | | | | | |
| 32 | | | | | | | | | | | | | | | | | |
| 48 | | | | | | | | | | | | | | | | | |
| 64 | | | | | | | | | | | | | | | | | |
| 80 | | | | | | | | | | | | | | | | | |
| 96 | | | | | | | | | | | | | | | | | |
| 102 | | | | | | | | | | | | | | | | | |
| 128 | | | | | | | | | | | | | | | | | |
| 144 | | | | | | | | | | | | | | | | | |
| 160 | | | | | | | | | | | | | | | | | |
| 176 | | | | | | | | | | | | | | | | | |
| 192 | | | | | | | | | | | | | | | | | |
| 208 | | | | | | | | | | | | | | | | | |
| 224 | | | | | | | | | | | | | | | | | |
| 240 | | | | | | | | | | | | | | | | | |
| 255 | | | | | | | | | | | | | | | | | |

655,657

| | | | |
|---|---|---|---|
| Gray | 0 | ..... | 255 |
| Voltage(pos) | 7 | ..... | 14.25 |
| Voltage(neg) | 5 | ..... | 0.25 |

DISPLAY DEVICE AND DRIVING METHOD THEREOF

CROSS-REFERENCE TO RELATED APPLICATIONS

This application claims priority to and the benefit of Korean Patent Application No. 10-2013-0079953 filed in the Korean Intellectual Property Office on Jul. 8, 2013, the entire contents of which are incorporated herein by reference.

BACKGROUND

1. Field

The described technology generally relates to a display device and a driving method thereof.

2. Description of the Related Technology

Display devices, such as liquid crystal displays (LCDs) and organic light-emitting diode (OLED) displays, generally include a display panel and a driving device for driving the display panel.

The display panel generally includes a plurality of signal lines and a plurality of pixels PX which are connected to the signal lines and are arranged in a substantially matrix form.

The signal lines generally include a plurality of gate lines transferring gate signals and a plurality of data lines transferring data voltages.

Each pixel generally includes at least one switching element connected to a corresponding gate line and a corresponding data line, at least one pixel electrode connected to the switching element, and a counter electrode which faces the pixel electrode and is applied with a common voltage. The switching element generally includes at least one thin film transistor and is turned on or turned off depending on the gate signal transferred by the gate line to selectively transfer the data voltage transferred by the data line to the pixel electrode. Each pixel typically displays an image with a luminance depending on the difference between the data voltage and the common voltage.

Images displayed on a display device are generally divided into still images and moving images. When the image signals of adjacent frames are the same, a still image can be displayed and when the image signals of adjacent frames are different from each other, a moving image can be displayed.

The driving device generally includes a graphic processing unit (GPU), a driver, and a signal controller which controls the driver. Generally, the graphic processing unit transfers an input image signal for the image to be displayed on the display panel to the signal controller and the signal controller generates a control signal for driving the display panel and transfers the generated control signal to the driver, along with the image signal. The driver generally includes a gate driver which generates the gate signals and a data driver which generates the data voltages.

The above information disclosed in this Background section is only intended to facilitate the understanding of the background of the described technology and therefore it may contain information that does not constitute the prior art that is already known in this country to a person of ordinary skill in the art.

SUMMARY OF CERTAIN INVENTIVE ASPECTS

One inventive aspect is a display device for enhancing a display quality by removing a ghost phenomenon or a shading phenomenon which is caused by charging-type coupling of all the adjacent rows.

One inventive aspect is a display device including a display panel including a plurality of pixels, a data driver transferring data voltages to a plurality of data lines, a gate driver transferring gate signals to a plurality of gate lines, and a signal controller controlling the data driver and the gate driver and including a signal processor, in which the signal processor includes a memory storing an input image signal of an (N−1)-th (N is a natural number of 2 or more) row and an input image signal of an N-th row, and a coupling index calculator calculating a coupling index which represents a degree of coupling between adjacent rows, and the signal processor compensates for the input image signal of a pixel of the N-th row to generate a compensated image single by using an input image signal of an (N+1)-th row, the input image signal of the (N−1)-th row and the input image signal of the N-th row which are received from the memory, and the calculated coupling index.

The coupling index may depend on a distance from the data driver to the pixel and a distance from the gate driver to the pixel.

The coupling index may depend on a function which depends on the characteristics of the display panel.

The signal processor may further include a three-dimensional lookup table unit which includes a plurality of lookup tables each storing compensation values according to the coupling index.

The three-dimensional lookup table unit may include a lookup table which corresponds to a positive coupling index and stores compensation values depending on values of the input image signal of the (N−1)-th row and the input image signal of the N-th row and a lookup table which corresponds to a negative coupling index and stores compensation values depending on values of the input image signal of the (N+1)-th row and the input image signal of the N-th row.

The signal processor may further include a signal compensator which generates a compensated image signal by using the compensation values received from the three-dimensional lookup table unit.

The signal processor may include a GV converter (or a gray-to-voltage converter) converting the input image signal of the (N−1)-th row, the input image signal of the N-th row, and the input image signal of the (N+1)-th row into voltages, a compensation voltage generator generating a compensation voltage by using the converted voltages from the GV converter and the coupling index, and a VG converter converting the compensation voltage into a gray.

The GV converter may include a conversion lookup table which is defined depending on a function between the data voltage applied to the display panel and grays.

The compensation voltage generator may generate the compensation voltage Vt according to: $Vt=V(N)-CX\times(V(N-1)-V(N))$ (when $CX>0$) and $Vt=V(N)-CX\times(V(N+1))-V(N))$ (when $CX>0$), wherein Vt represents the compensation voltage, CX represents the coupling index, V(N) represents a voltage obtained by converting the input image signal of the N-th row, V(N−1) represents a voltage obtained by converting the input image signal of the (N−1)-th row, and V(N+1) represents a voltage obtained by converting the input image signal of the (N+1)-th row.

The VG converter (or a voltage-to-gray converter) may convert the compensation voltage into the gray by using the conversion lookup table.

Another aspect is a method of driving a display device including a display panel, a data driver, a gate driver, and a signal controller, the method including storing an input image signal of an (N−1)-th (N is a natural number of 2 or more) row and an input image signal of an N-th row, calculating a coupling index which represents a degree of coupling between adjacent rows, and compensating for the input image signal of a pixel of the N-th row by using an input image signal of the (N+1)-th row, the input image signal of the (N−1)-th row and the input image signal of the N-th row, and the calculated coupling index to generate a compensated image signal for one pixel of the N-th row.

The calculating of the coupling index may include using a distance from the data driver to the pixel and a distance from the gate driver to the pixel.

The calculating of the coupling index may include tuning the coupling index by using a one-dimensional function according to characteristics of the display panel.

The compensating of the input image signal for the pixel of the N-th row may include using a three-dimensional lookup table unit which includes a plurality of lookup tables storing compensation values depending on the coupling index.

The three-dimensional lookup table unit may include a lookup table which corresponds to a positive coupling index and stores compensation values depending on values of the input image signal of the (N−1)-th row and the input image signal of the N-th row and a lookup table which corresponds to a negative coupling index and stores compensation values depending on values of the input image signal of the (N+1)-th row and the input image signal of the N-th row.

The compensating of the input image signal for the pixel of the N-th row may include using the compensation values received from the three-dimensional lookup table unit.

The compensating of the input image signal of the N-th row may include converting the input image signal of the (N−1)-th row, the input image signal of the N-th row, and the input image signal of the (N+1)-th row into voltages, generating a compensation voltage by, using the converted voltage and the coupling index, and converting the compensation voltage into a gray.

The converting of the input image signal of the (N−1)-th, the input image signal of the N-th row, and the input image signal of the (N+1)-th row into the voltages may include using a conversion lookup table which is defined depending on a functional relationship between the data voltage applied to the display panel and grays.

The generating of the compensation voltage by using the converted voltages and the coupling index may include generating the compensation voltage Vt according to: $Vt=V(N)-CX\times(V\,N-1)-V(N))$ (when $CX>0$) and $Vt=V(N)-CX\times(V(N+1))-V(N))$ (when $CX>0$), wherein Vt represents the compensation voltage, CX represents the coupling index, V(N) represents a voltage obtained by converting the input image signal of the N-th row, V(N−1) represents a voltage obtained by converting the input image signal of the (N−1)-th row, and V(N+1) represents a voltage obtained by converting the input image signal of the (N+1)-th row.

The converting of the compensation voltage into the gray may include using the conversion lookup table.

According to at least one embodiment of the described technology, it is possible to enhance the display quality of a display device by substantially removing a ghosting phenomenon or a shading phenomenon which is caused by charging-type coupling of the display device.

BRIEF DESCRIPTION OF THE DRAWINGS

FIGS. 5 and 6 are diagrams illustrating one lookup table included in a three-dimensionally configured lookup table included in the signal controller of the display device according to an exemplary embodiment.

DETAILED DESCRIPTION

Since higher-quality images may be displayed as the resolution of display devices is increased, it is desirable to increase the resolution of display devices. As the resolution of a display device is increased, the time available to charge each pixel with a corresponding data voltage is decreased and the charging rate of each pixel is reduced, which may result in charging-type blurring. In particular, when the polarity of the data voltage is inverted, the time available to charge the data voltage to a target data voltage may be insufficient, and the charging rate of each pixel may therefore be reduced.

Further, a phenomenon termed ghosting may occur in which a data voltage is applied to a previous row is applied to the current row due to signal delay.

Further, a phenomenon termed shading may occur in which a data voltage of the following row is applied to the current row due to signal delay.

The described technology will be described more fully hereinafter with reference to the accompanying drawings, in which exemplary embodiments of the described technology are shown. As those skilled in the art would realize, the described embodiments may be modified in various different ways, all without departing from the spirit or scope of the described technology.

Hereinafter, a display device and a driving method thereof according to an exemplary embodiment of the described technology will be described in detail with reference to the accompanying drawings.

First, a display device according to an exemplary embodiment will be described with reference to FIGS. 1 to 6.

Figure 1:
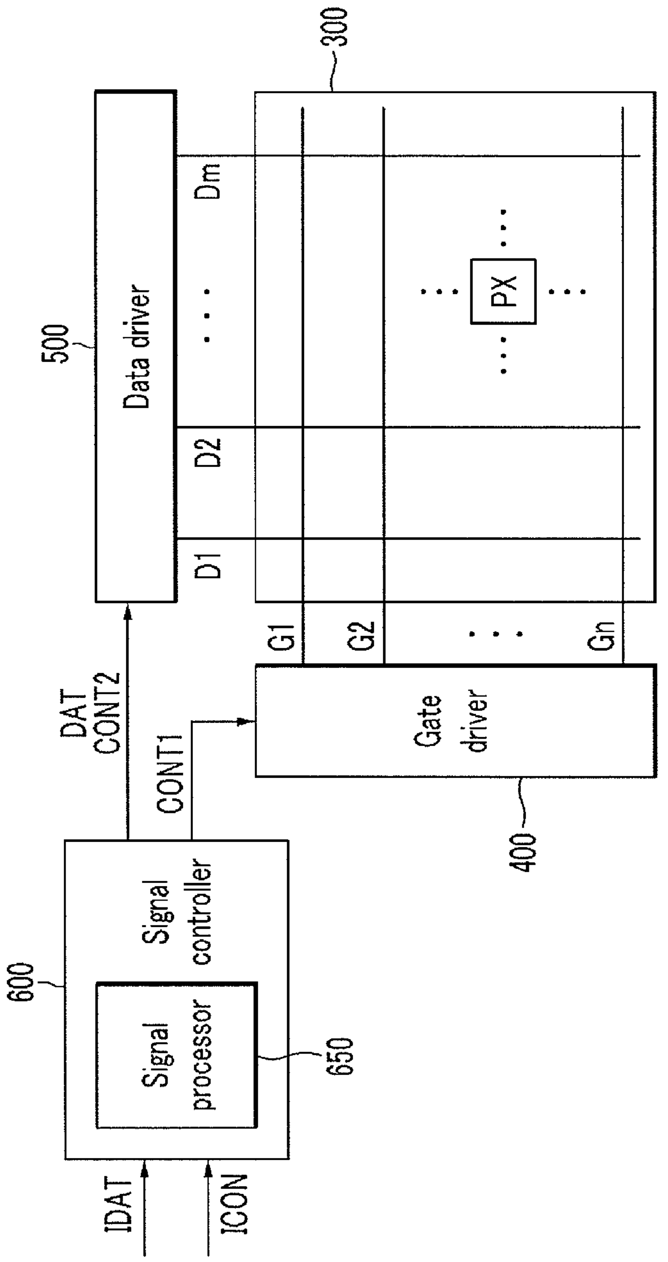
FIGS. 1 and 2 are block diagrams of a display device according to an exemplary embodiment of the described technology.
Figure 2:
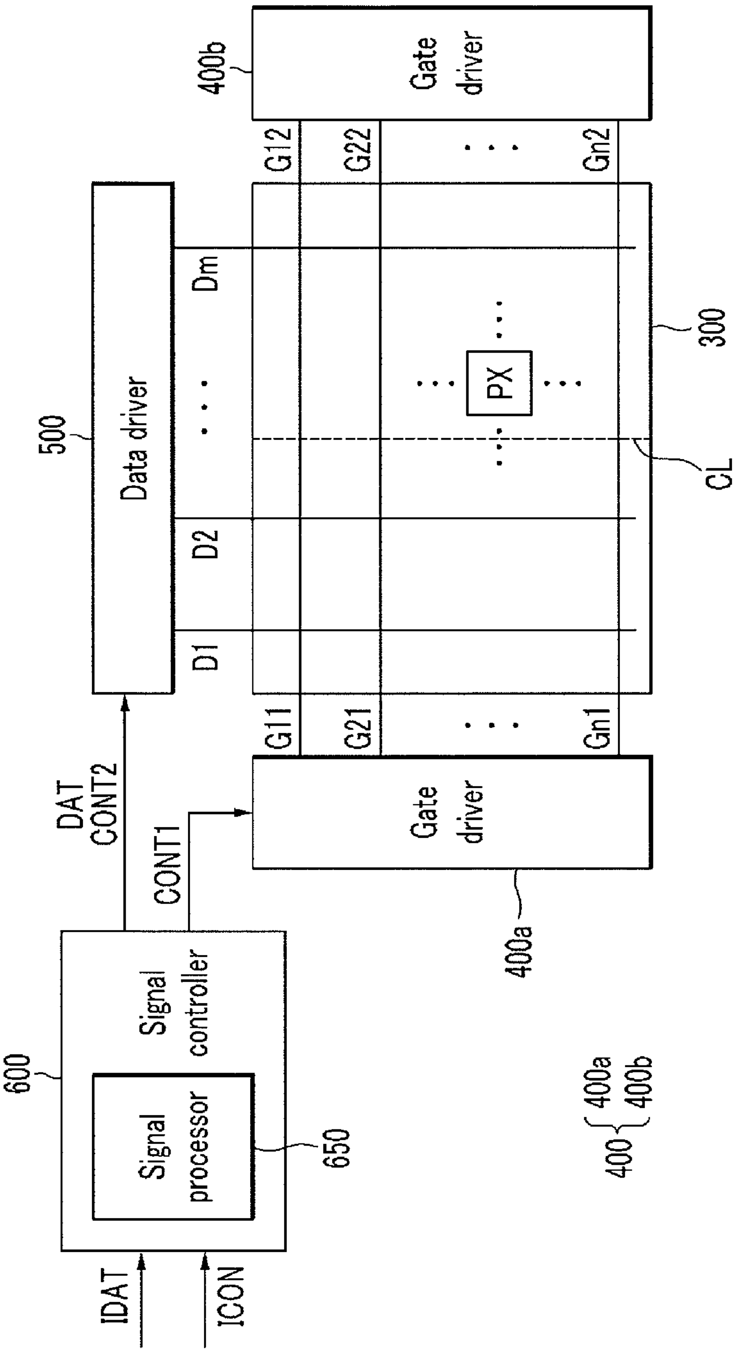
Figure 3:
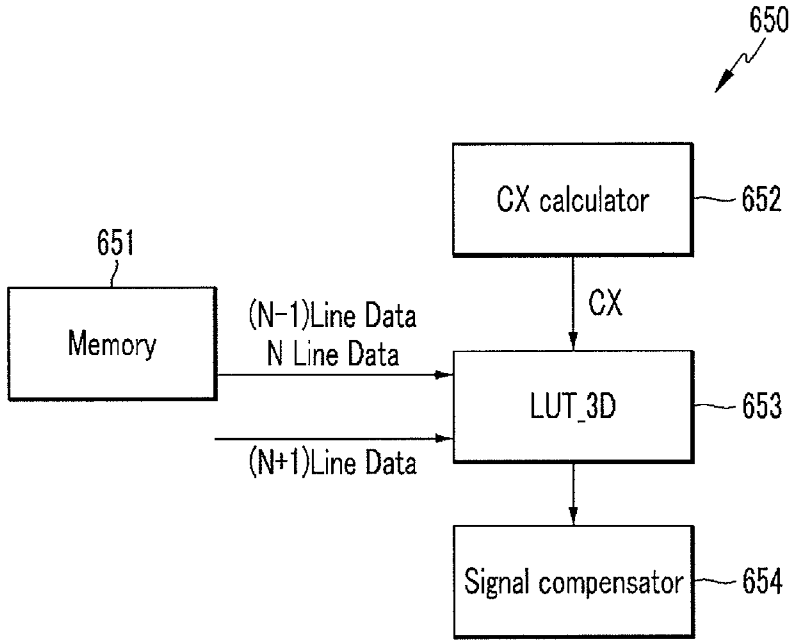
FIG. 3 is a block diagram of a signal compensator of the display device according to an exemplary embodiment.
Figure 4:
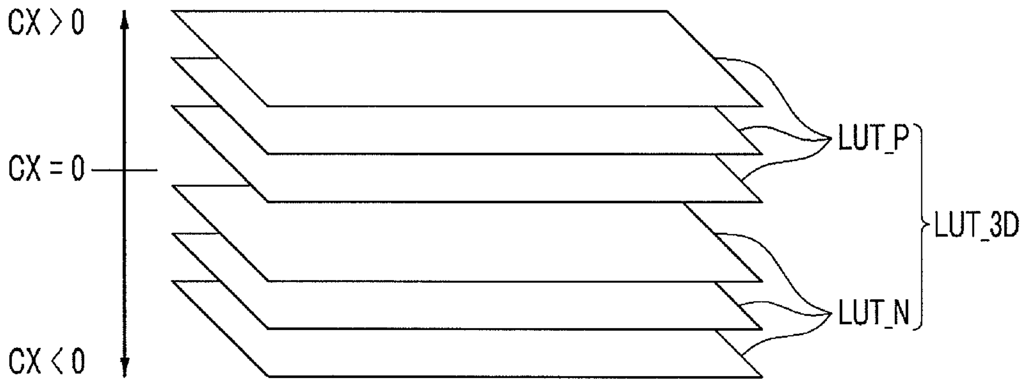
FIG. 4 is a diagram illustrating a three-dimensionally configured lookup table included in a signal controller of the display device according to an exemplary embodiment.

FIGS. 1 and 2 are block diagrams of a display device according to an exemplary embodiment and FIG. 3 is a block diagram of a signal compensator of the display device according to an exemplary embodiment. FIG. 4 is a diagram illustrating a three-dimensionally configured lookup table included in a signal controller of the display device according to an exemplary embodiment and FIGS. 5 and 6 are diagrams illustrating one lookup table included in the three-dimensionally configured lookup table according to an exemplary embodiment.

Referring first to FIG. 1, the display device according to an exemplary embodiment includes a display panel 300, a gate driver 400, a data driver 500, and a signal controller 600 which controls the data driver 500 and the gate driver 400.

The display panel 300 may be a display panel which is included in various flat panel displays (FPDs), such as a liquid crystal display (LCD), an organic light-emitting diode (OLED) display, or an electrowetting display (EWD).

The display panel 300 includes a plurality of gate lines G1 to Gn, a plurality of data lines D1 to Dm, and a plurality of pixels PXs which are connected to the gate lines G1 to Gn and the data lines D1 to Dm.

The gate lines G1 to Gn may transfer gate signals, and may extend in a substantially row direction and be substantially parallel to each other. The data lines D1 to Dm may transfer data voltages, and may extend in a substantially column direction and be substantially parallel to each other.

The pixels PXs may be arranged in a substantially matrix form. Each pixel PX may include at least one switching element connected to the corresponding gate lines G1 to Gn and the corresponding data lines D1 to Dm and at least one pixel electrode connected to the switching element. The switching element may include at least one thin film transistor and is turned on or turned off depending on the gate signals transferred by the gate lines G1 to Gn to selectively transfer the data voltage transferred by the data lines D1 to Dm to the pixel electrode. Each pixel PX may display an image with a luminance depending on the data voltage applied to the pixel electrode.

Each pixel PX displays one of primary colors (spatial division) or each pixel PX alternately displays the primary colors over time (temporal division), such that desired colors may be recognized by the spatial and temporal sum of the displayed primary colors. An example of the primary colors may include three primary colors, such as red, green, and blue. A plurality of adjacent pixels PX displaying different primary colors may together form one set (referred to as a dot). The dot may display a white image.

The gate driver 400 receives a gate control signal CONT1 from the signal controller 600 and generates gate signals which are a combination of a gate-on voltage Von and a gate-off voltage Voff capable of turning on and turning off the switching elements of the pixels PX based on the transferred gate control signal CONT1. The gate control signal CONT1 includes a scanning start signal STV which instructs a scanning start and at least one clock signal CPV which controls an output period of the gate-on voltage Von, and the like. The gate driver 400 is connected to the gate lines G1 to Gn of the display panel 300 to apply the gate signals to the gate lines G1 to Gn.

Referring to FIG. 2, the gate driver 400 according to another exemplary embodiment may include first and second gate drivers 400*a* and 400*b* which are disposed at both sides of the display panel 300. In this case, the gate lines G1 to Gn may be divided into first gate lines G11 to Gn1 and second gate lines G12 to Gn2 which are disposed in different regions of the display panel. The first gate lines G11 to Gn1 are connected to the first gate driver 400*a* to receive the gate signals and the second gate lines G12 to Gn2 are connected to the second gate driver 400*b* to receive the gate signals.

The data driver 500 receives a data control signal CONT2 and output image signals DAT from the signal controller 600. The data driver 500 selects a gray voltage corresponding to each output image signal DAT, thereby converting the output image signal DAT into a data voltage which is an analog data signal. The output image signal DAT, which is a digital signal, has a defined number of values (or grays). The data control signal CONT2 includes a horizontal synchronization start signal which indicates a transmission start of the output image signal DAT of a pixel PX of one row, at least one data load signal TP and a data clock signal which represents an instruction to apply the data voltage to the data lines D1 to Dm, and the like. The data control signal CONT2 may further include an inversion signal that inverts the polarity of the data voltage with respect to a common voltage Vcom (referred to as the polarity of the data voltage). The data driver 500 is connected to the data lines D1 to Dm of the display panel 300 to apply data voltages Vd to the corresponding data lines D1 to Dm.

Unlike the embodiment illustrated in FIG. 1, the data driver 500 may also include a pair of data drivers (not illustrated) which face each other at upper and lower portions of the display panel 300. In this case, the data driver disposed at the upper portion may apply the data voltages Vd from above the data lines D1 to Dm of the display panel 300 and the data driver disposed at the lower portion may apply the data voltages Vd from under the data lines D1 to Dm of the display panel 300. Further, the data lines D1 to Dm connected to the data driver disposed at the lower portion and the data lines D1 to Dm connected to the data driver disposed at the upper portion may also be separated from each other.

The signal controller 600 receives an input image signal IDAT and an input control signal ICON which controls the display thereof, from an external graphic processing unit (not illustrated) (or graphic processor), and the like. The signal controller 600 appropriately processes the input image signal IDAT based on the input control signal (ICON) to convert the input image signal IDAT into the output image signal DAT. The signal controller 600 generates the gate control signal CONT1, the data control signal CONT2, and the like, based on the input image signal IDAT and the input control signal ICON. The signal controller 600 transfers the gate control signal CONT1 to the gate driver 400 and the data control signal CONT2 and the processed output image signal DAT to the data driver 500.

Referring to FIGS. 1 and 2, the signal controller 600 includes a signal processor 650 which compensates for the input image signal IDAT.

Referring to FIG. 3, the signal processor 650 may include a memory 651, a coupling index CX calculator 652, a three-dimensional lookup table unit (LUT_3D) (or three-dimensional lookup table memory) 653, and a signal compensator 654.

The memory 651 may include at least two line memories which may store the input image signals IDATs for each row. When a current pixel row, used to compensate for the input image signal IDAT, is set to be an N-th (N is a natural number) row, the memory 651 may store the data of an input image signal IDAT of an (N−1)-th row which is a previous row and the data of an input image signal IDAT of the N-th row.

The memory 651 may transfer the stored data of the input image signal IDAT of the (N−1)-th row and the stored data of the input image signal IDAT of the N-th row to the three-dimensional lookup table unit 653.

The coupling index CX calculator 652 stores or calculates the coupling index CX which represents the degree of charging-type coupling between the adjacent rows. At the time of calculating the coupling index CX, the coupling index CX may be calculated by using an interpolation method.

The coupling index CX may vary depending on delay occurrence factors of the data voltages and the gate signals. For example, the coupling index CX may depend on the degree of charging-type coupling based on the position of the pixels PX within the display panel 300 and the structure of the display panel 300. The coupling index CX may be determined by displaying a reference pattern on the display and then measuring the actual degree of coupling.

The coupling index CX may be a negative number, a positive number, or 0.

The detailed method of calculating the coupling index CX will be described below.

The coupling index CX calculator 652 may transfer the calculated coupling index CX to the three-dimensional lookup table unit 653.

Referring to FIG. 4, the three-dimensional lookup table unit 653 includes a plurality of different lookup tables depending on the coupling index CX. Each lookup table is configured two dimensionally, and the lookup tables are arranged depending on the coupling index CX such that the lookup table unit 653 is configured three dimensionally.

Each lookup table of the three-dimensional lookup table unit 653 stores compensation values for some grays or all the grays of the input image signal IDAT of the N-th row.

Referring to FIGS. 4 to 6, the three-dimensional lookup table unit 653 includes a ghost lookup table LUT_P corresponding to a positive coupling index CX and a shading lookup table LUT_N corresponding to a negative coupling index CX. The ghost lookup table LUT_P stores the compensation values of the input image signal IDAT of the N-th row for the gray of the input image signal IDAT of the (N−1)-th row which is a previous row. The shading lookup table LUT_N stores the compensation value of the input image signal IDAT of the N-th row for the gray of the input image signal IDAT of the (N+1)-th row which is the following row.

When the three-dimensional lookup table unit 653 includes a lookup table corresponding to the case in which the coupling index CX is 0, the compensation value of the input image signal IDAT of the N-th row in the corresponding lookup table may be the same as that of the original input image signal IDAT.

The compensation value for grays which are not stored in each lookup table LUT_P and LUT_N may be obtained by a calculation method, such as various interpolation methods. Similarly, the lookup tables for the coupling indices CX in which the lookup tables LUT_P and LUT_N are not prepared may be calculated by various interpolation methods using the compensation values of the adjacent lookup tables LUT_P and LUT_N.

The three-dimensional lookup table unit 653 receives the coupling index CX from the coupling index calculator 652, receives the data of the input image signal IDAT of the (N−1)-th row and the data of the input image signal IDAT of the N-th row from the memory 651, and receives the data of the input image signal IDAT of the (N+1)-th row input from a source external to the signal controller 600 to obtain the compensation values for the input image signals IDAT of the corresponding pixels PX from the lookup tables LUT_P and LUT_N.

The three-dimensional lookup table unit 653 may transfer the compensation value for the input image signal IDAT of the pixel PX of the N-th row to the signal compensator 654.

The signal compensation unit 654 may compensate for and process the input image signal IDAT of the pixels PX of the N-th row by using the compensation value received from the three-dimensional lookup table unit 653 to generate the output image signal DAT.

The output image signal DAT obtained by processing the compensated input image signal IDAT is input to the data driver 500 and the data driver 500 converts the output image signal DAT to generate the data voltages and output the generated data voltages to the display panel 300.

According to an exemplary embodiment, the three-dimensional lookup table unit 653 includes a plurality of lookup tables LUT_P and LUT_N depending on the coupling indices CX which relies on the position of the charged pixel PX within the display panel 300 and the degree of coupling for each position. The compensation values of each lookup table LUT_P and LUT_N vary depending on the difference in the data between the input image signals IDAT of the adjacent rows. Therefore, when the image is displayed by converting the compensated input image signal IDAT into the data voltage Vd by using the three-dimensional lookup table unit 653, the charging-type coupling between the adjacent rows due to the signal delay depending on the position of pixels PX of the display panel 300 may be substantially removed and the degradation in image quality, such as the charging-type blurring caused by the insufficient charging rate of the corresponding pixels PX, may be substantially prevented.

The effect and the driving method of the display device according to an exemplary embodiment will be described with reference to FIGS. 7 to 10.

Figure 7:
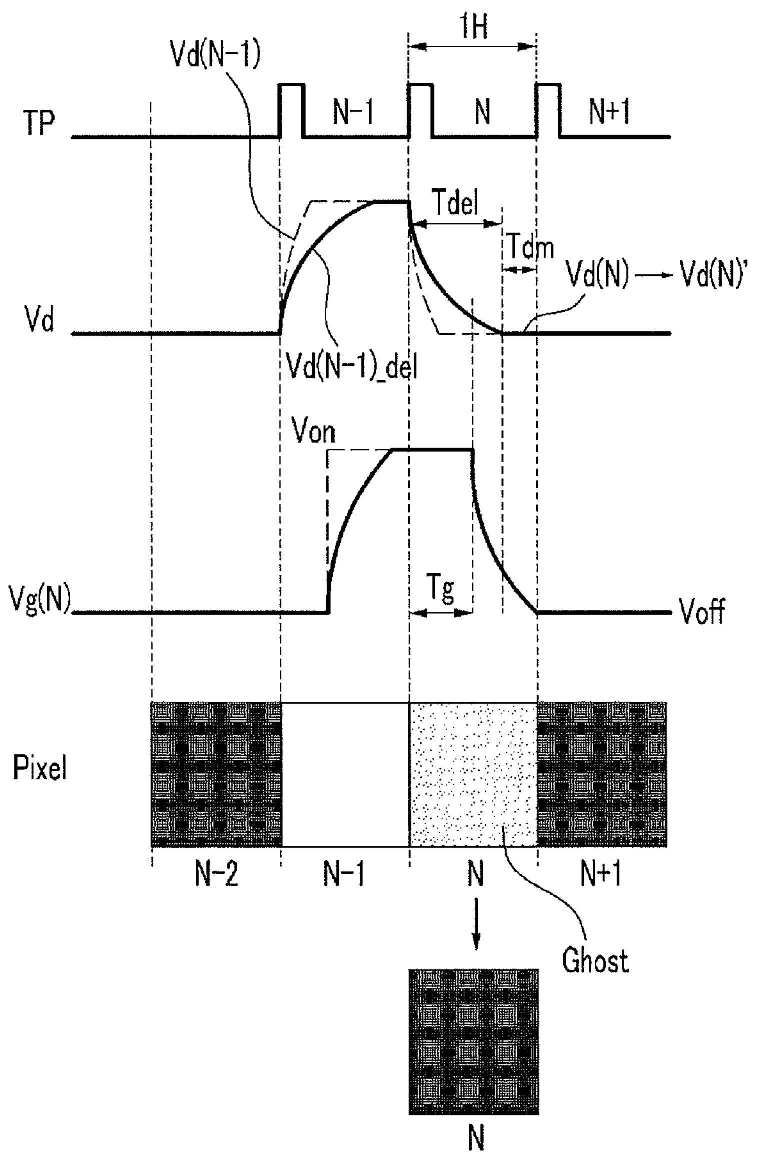
FIGS. 7 and 8 are timing diagrams of driving signals of the display device according to an exemplary embodiment.
Figure 8:
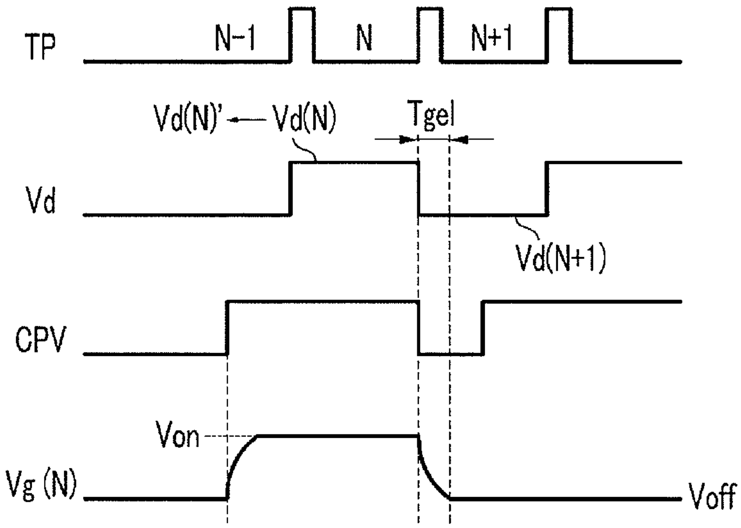
Figure 9:
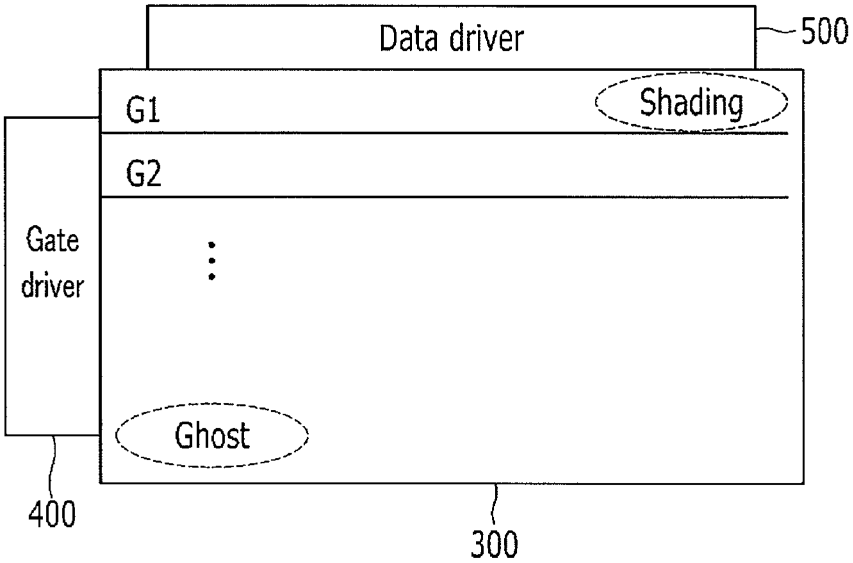
FIGS. 9 and 10 are block diagrams of the display device according to an exemplary embodiment.
Figure 10:
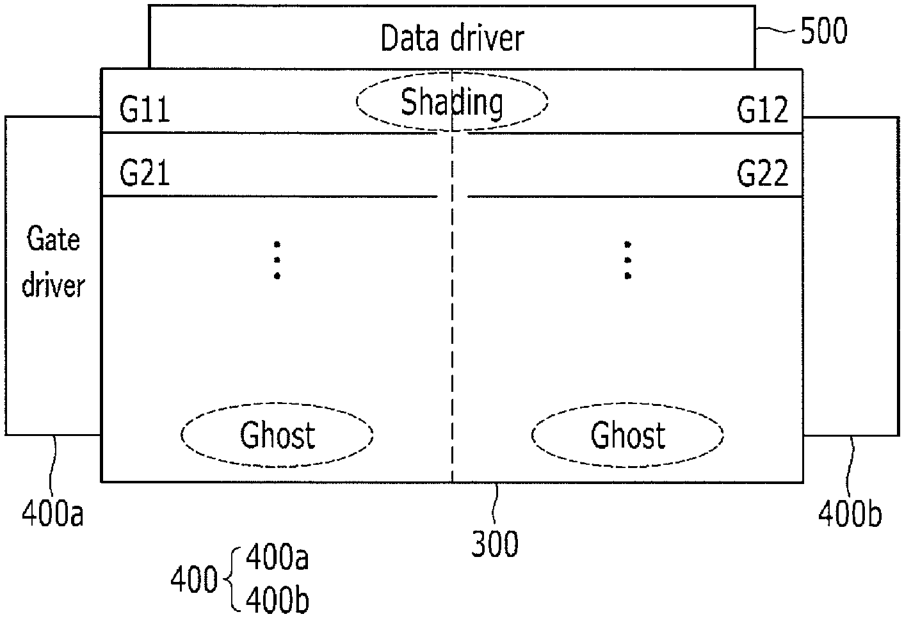

FIGS. 7 and 8 are timing diagrams of driving signals of the display device according to an exemplary embodiment and FIGS. 9 and 10 are block diagrams of the display device according to an exemplary embodiment.

Next, the driving method of the display device according to an exemplary embodiment will be described. First, the signal controller 600 receives the input image signal IDAT and the input control signal ICON from an external source and then generates and processes the compensated input image signal to convert the input image signal IDAT into the output image signal DAT. The controller also generates the gate control signal CONT1, the data control signal CONT2, and the like. The signal controller 600 transmits the gate control signal CONT1 to the gate driver 400 and the data control signal CONT2 and the output image signal DAT to the data driver 500.

The data driver 500 receives the output image signal DAT for the pixels PX of one row and receives the data control signal CONT2 from the signal controller 600. Depending on the data control signal CONT2, the data driver 500 selects the gray voltage corresponding to each output image signal DAT to convert the output image signal DAT into the data voltages Vd which are the analog data signal and then applies the data voltages Vd to the corresponding data lines D1 to Dm.

The gate driver 400 applies the gate-on voltage Von to the gate lines G1 to Gn depending on the gate control signal CONT1 received from the signal controller 600 to turn-on the switching elements connected to the gate lines G1 to Gn. Next, the data voltages Vd applied to the data lines D1 to Dm are applied to the corresponding pixels PX through the turned on switching elements.

As such, when the gate-on voltage Von is applied to the gate lines G1 to Gn, the switching elements connected to the gate lines G1 to Gn are turned on and the data voltages Vd applied to the data lines D1 to Dm are applied to the corresponding pixels PX through the turned on switching elements.

In more detail, referring to FIG. 7, the data driver 500 synchronizes with a rising edge of the data load signal TP to sequentially apply the data voltages Vd to the data lines D1 to Dm. The interval between adjacent rising edges of the data load signal TP may be a 1 horizontal period (written as "1H", substantially the same as one period of a horizontal synchronizing signal Hsync and a data enable signal DE).

FIG. 7 illustrates only a data voltage Vd(N−1) of the (N−1)-th row which is white and a data voltage Vd(N) of the N-th row which is black. Further, FIG. 7 illustrates only a gate signal Vg(N) which is applied to the N-th row.

As illustrated in FIG. 7, the data voltage Vd(N−1) is delayed depending on the degree to which the pixel PX is spaced apart from the data driver 500, and thus may be a delayed data voltage Vd(N−1)_del. The delayed data voltage Vd(N−1)_del may affect the charging time of the data voltage Vd(N) of the N-th row over most of the delay time Tdel. Therefore, the actual charging time Tdm in which the data voltage Vd(N) may be charged in the pixel PX of the N-th row may be reduced by a length of time obtained by subtracting the Tdel from 1H. Therefore, the charging time of the data voltage Vd(N) of the N-th row may be insufficient and the image of the pixel PX of the N-th row may be the grey image gray, not the target black image, resulting in a ghosting phenomenon.

As illustrated in FIGS. 9 and 10, the ghosting phenomenon may occur in pixels PX which are far away from the data driver 500 and are at a position at which a small delay of the gate signal Vg(N) generated. The ghosting phenomenon corresponds to the case in which the coupling index CX is a positive number.

As described above, the signal processor 650 uses the three-dimensional lookup table unit 653 to compensate for the input image signal IDAT of the N-th row and output a compensated data voltage Vd(N)', such that the targeted black as indicated by the arrow in FIG. 7 may be displayed and the ghosting phenomenon may be substantially prevented.

FIG. 8 illustrates the data voltage Vd(N) of the N-th row which is white and the data voltage Vd(N+1) of the (N+1)-th row which is black. Further, FIG. 8 illustrates only the gate signal Vg(N) which is applied to the N-th row.

As illustrated in FIG. 8, the gate signal Vg(N) is delayed depending on the distance from the pixel PX to the gate driver 400. The gate signal Vg(N) is applied as a voltage larger than the gate-off voltage Voff to the gate lines G1 to Gn until the end of the delay time Tgel of the charging time of the data voltage Vd(N+1) of the (N+1)-th row. Therefore, the pixels PX of the N-th row are further applied with the data voltage Vd(N+1) for the pixels PX of the (N+1)-th row, such that a shading phenomenon which causes the image of the corresponding pixels PX to deviate from the targeted luminance may occur.

As illustrated in FIGS. 9 and 10, the shading phenomenon may occur in the pixels PX which are far away from the gate driver 400 and are at a position at which a small delay of the data voltage Vd is generated. The shading phenomenon corresponds to the case in which the coupling index CX is a negative number.

As described above, the signal processor 650 uses the three-dimensional lookup table unit 653 to compensate for the input image signal IDAT of the N-th row and outputs the compensated data voltage Vd(N)', such that the shading phenomenon may be substantially prevented.

As such, the image of one frame may be displayed by applying the gate-on voltage Von to all the gate lines G1 to Gn and applying the data signal to the all the pixels PXs.

A next frame starts after one frame ends and the state of the inversion signal applied to the data driver 500 is controlled so that the polarity of the data voltage Vd applied to each pixel PX is opposite to the polarity in the previous frame. In this case, the polarity of the data voltage Vd flowing through one of the data lines D1 to Dm may be periodically changed or the polarities of the data voltages Vd applied to pixel rows may also be different from each other, even within one frame, depending on the characteristics of the inversion signal.

According to another exemplary embodiment, the memory 651 included in the signal processor 650 may include a frame memory, instead of a line memory. According to embodiments, in the compensation for substantially removing the shading phenomenon, in order to compensate for the input image signal IDAT of the N-th row, when referring to the data of the input image signal IDAT of the (N+1)-th row, which is the next row, the input image signal IDAT of the (N+1)-th row may also be changed by the data of the input image signal IDAT of the (N+2)-th row. Therefore, in order to compensate for the input image signal IDAT of the N-th row which is the current row, by referring to only the input image signal IDAT of the (N+1)-th row, the charging-type coupling compensation may not be complete. Therefore, the shading phenomenon may be substantially completely removed by compensating for the input image signal IDAT of the N-th row by referring to the input image signal IDAT of all of the subsequent rows through the frame memory of the memory 651.

Next, a method of calculating the coupling index CX in the driving method of the display device according to an exemplary embodiment will be described with reference to FIGS. 11 to 13 along with the above-mentioned drawings.

Figure 11:
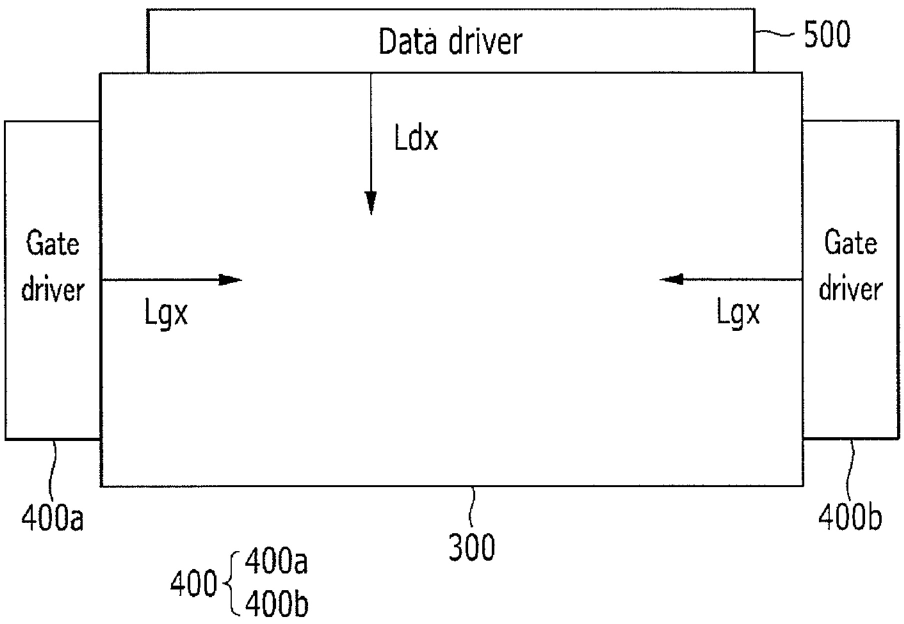
FIG. 11 is a block diagram of the display device according to an exemplary embodiment.
Figure 12:
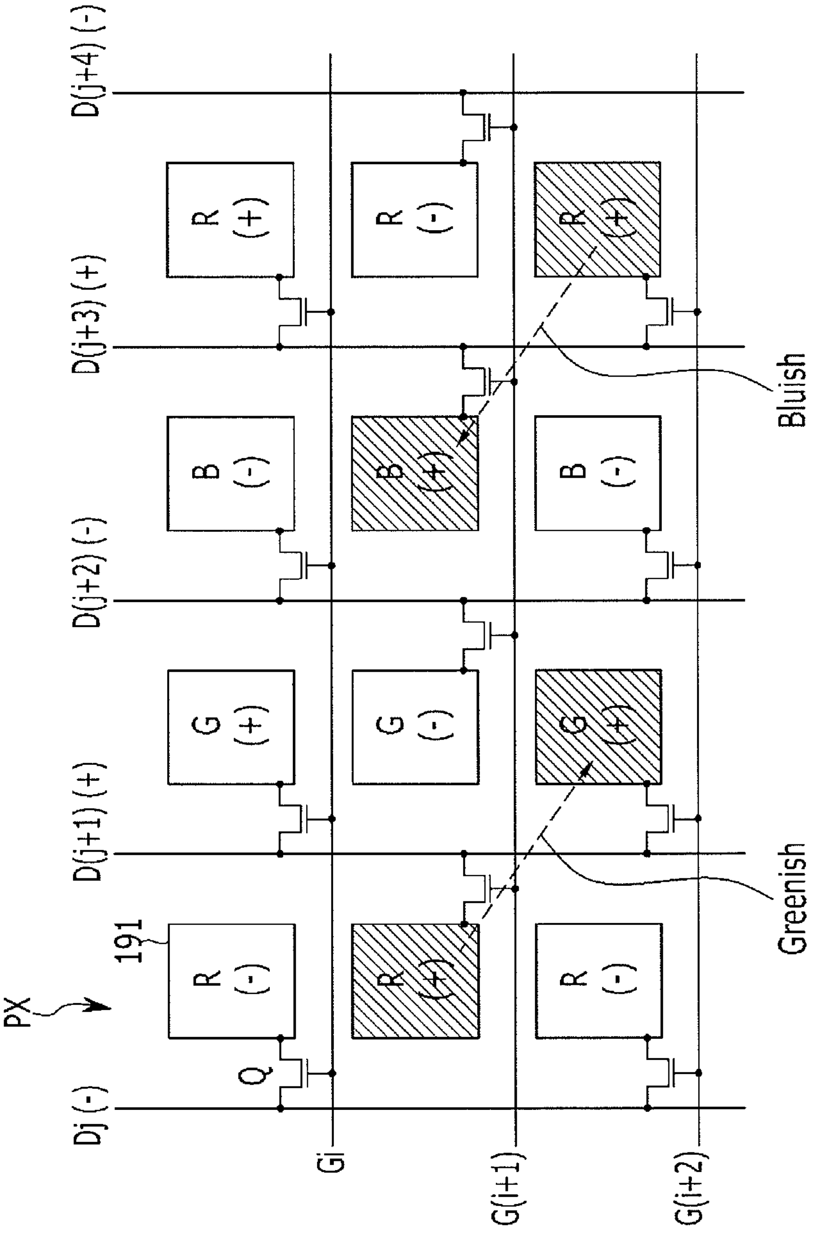
FIG. 12 is a layout diagram of a pixel and a signal line of the display device according to an exemplary embodiment.
Figure 13:
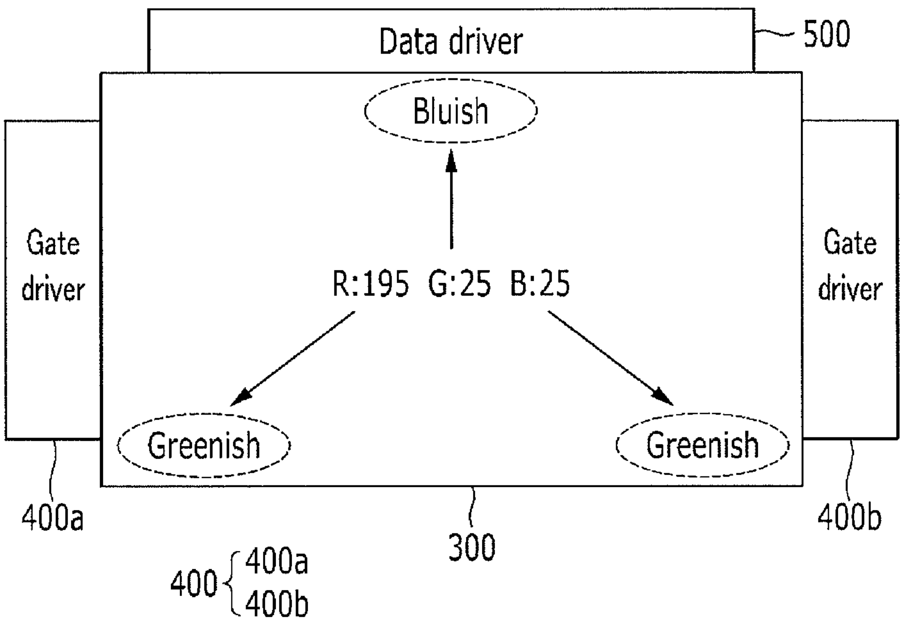
FIG. 13 is a block diagram illustrating an example of positions at which color blurring may appear when the display device according to an exemplary embodiment displays an image having a predetermined gray.

FIG. 11 is a block diagram of the display device according to an exemplary embodiment, FIG. 12 is a layout diagram of a pixel and a signal line of the display device according to an exemplary embodiment, and FIG. 13 is a block diagram illustrating an example of positions at which color blurring appears when the display device according to an exemplary embodiment displays an image having a predetermined gray.

Since the signal delay varies depending on the RC values of the gate lines G1 to Gn and the data lines D1 to Dm, the coupling index CX may vary depending on the distance from each of the data driver 500 and the gate driver 400 to the corresponding pixel PX. Further, the degree of signal delay may vary depending on the structure of the display panel 300 and therefore the coupling index CX needs to be finely tuned to the individual characteristics of the display panel 300.

The coupling index CX may be calculated based on, for example, the following Equation 1.

$$Cdx = Ldx \times \alpha(Dn)$$

$$Cgx = Lgx \times \beta(Gn)$$

$$CX = Cdx - Cgx \quad \text{Equation 1}$$

Referring to FIG. 1, in the above Equation 1, Ldx is a variable which represents the distance to the charged corresponding pixel PX from the data driver 500 and may be represented by (the row number of the pixel PX from the data driver 500)/(the total number of rows). Therefore, Ldx may have a value which is larger than 0 and equal to or less than 1. Lgx is which is a variable representing the distance to the charged corresponding pixel PX from the gate driver 400 and may be represented by (the column number of the pixel from the gate driver 400)/(the total number of columns through which the gate driver 400 transfers gate signals). Therefore, Lgx may have a value which is larger than 0 and equal to or smaller than 1.

In the above Equation 1, $\alpha$(Dn) and $\beta$(Gn) are functions which tune the coupling index CX so as to meet the characteristics of the display panel 300, in which Dn may represent the row number of the pixel PX from the data driver 500 and Gn may represent the column number of the pixel PX from the gate driver 400. $\alpha$(Dn) and $\beta$(Gn) may each be one-dimensional functions.

$\alpha$(Dn) and $\beta$(Gn) for tuning the coupling index CX may vary depending on the characteristics of the display panel 300. In order to obtain $\alpha$(Dn) and $\beta$(Gn) for tuning, a reference pattern may be displayed on the display panel 300 and the color uniformity generated by the charging-type coupling may be measured.

The structure of the display panel 300 will be described with reference to FIG. 12.

Referring to FIG. 12, the display panel 300 of the display device may include a plurality of gate lines Gi, G(i+1), . . . , which extend in a row direction, a plurality of data lines Dj, D(j+1), . . . , which extend in a column direction, and a plurality of pixels PXs. Each pixel PX may include a pixel electrode 191 which is connected to the gate lines Gi, G(i+1), . . . , and the data lines Dj, D(j+1), . . . , through the switching element Q. In the FIG. 12 embodiment, each pixel PX represents a primary color of red (R), green (G), or blue (B), but is not limited thereto.

The pixels which represent the same primary color R, G, and B may be disposed in one pixel array. For example, a pixel column of red pixels R, a pixel column of green pixels G, and a pixel column of blue pixels B may be alternately disposed. The data lines Dj, D(j+1), . . . may be each disposed in each pixel array and the gate lines G1, G(i+1), . . . may each be disposed in each pixel row, but the above exemplary embodiments are not limited thereto.

The pixels R, G, and B which are disposed in one pixel array to represent the same primary color may be connected to any one of two data lines Dj, D(j+1), . . . , which are adjacent to each other. In particular, as illustrated in FIG. 12, the pixels R, G, and B which are disposed in one pixel array may be alternately connected to two data lines Dj, D(j+1), . . . , which are adjacent to each other. The pixels R, G, and B which are disposed in the same pixel row may be connected to the same gate line Gi, Gi+1, . . . .

The adjacent data lines Dj, D(j+1), . . . , may be applied with data voltages which have opposite polarities to each other. The data voltages may have polarities which are inverted in each frame.

Therefore, the pixels R, G, and B which are adjacent to each other in a column direction may be applied with the data voltages having opposite polarities to each other and the pixels R, G, and B which are adjacent to each other in one pixel row may be applied with data voltages having opposite polarities to each other, such that the pixels R, G, and B may be driven in a substantially 1×1 dot inversion form. That is, even though the pixels R, G, and B are driven in a column inversion form in which the data voltages which are applied to the data lines Dj, D(j+1), . . . , maintain the same polarity for one frame, dot inversion driving may be realized.

FIG. 13 illustrates positions at which the ghosting phenomenon may occur when a red gray of the reference pattern is 195, a green gray thereof is 25, and a blue gray thereof is 25. As illustrated in FIG. 12, the green pixels G are affected by the data voltage of the red pixels R of the previous row and thus may become more greenish. Further, at positions at which the shading phenomenon may occur when the same reference pattern is displayed, as illustrated in FIG. 12, the blue pixels B are affected by the data voltage of the red pixels R of the next row and thus may become more bluish.

As such, $\alpha$ (Dn) and $\beta$ (Gn) may be defined based on the results obtained by the display characteristics of the color uniformity or the color blurring after the image of the reference pattern is displayed, and the coupling index CX may be tuned based on the defined $\alpha$ (Dn) and $\beta$ (Gn).

Hereinafter, the display device and the driving method thereof according to an exemplary embodiment will be described with reference to FIGS. 14 to 16. The same constituent elements as the above-mentioned exemplary embodiments are denoted by the same reference numerals and the same description thereof will be omitted.

Figures 14, 15:
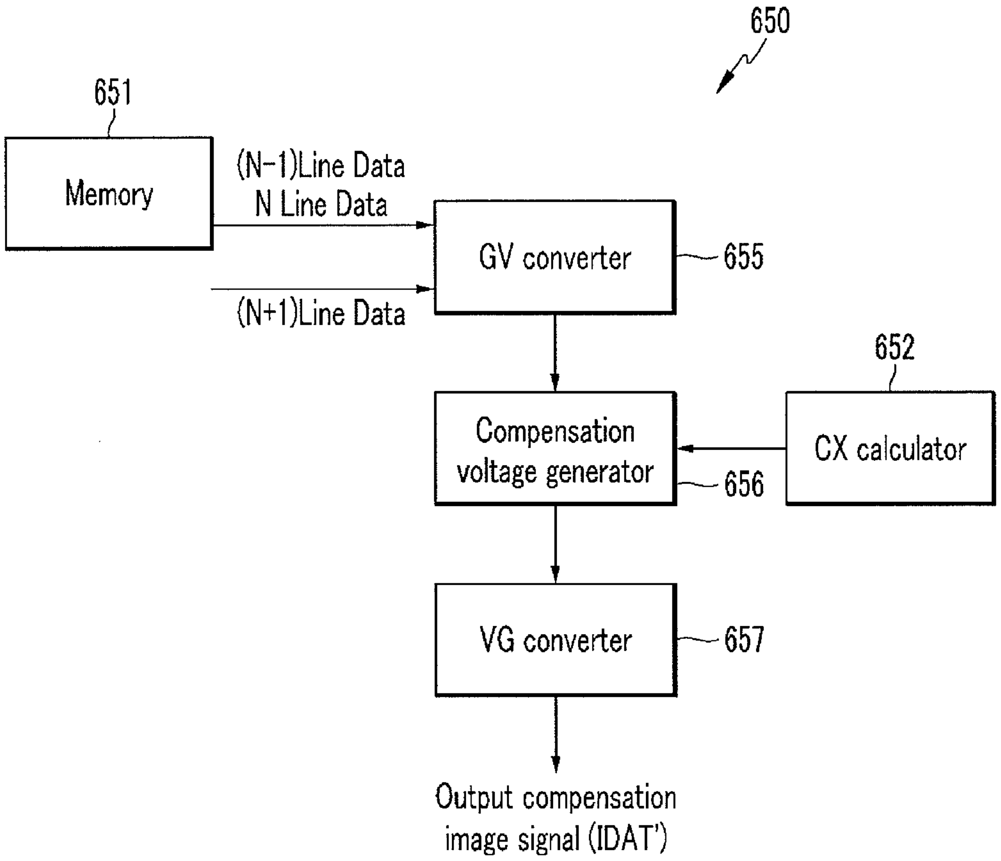
FIG. 14 is a block diagram of a signal compensator of the display device according to an exemplary embodiment.
FIG. 15 is a diagram illustrating a lookup table included in a GV converter and a VG converter as illustrated in FIG. 14.
Figure 16:
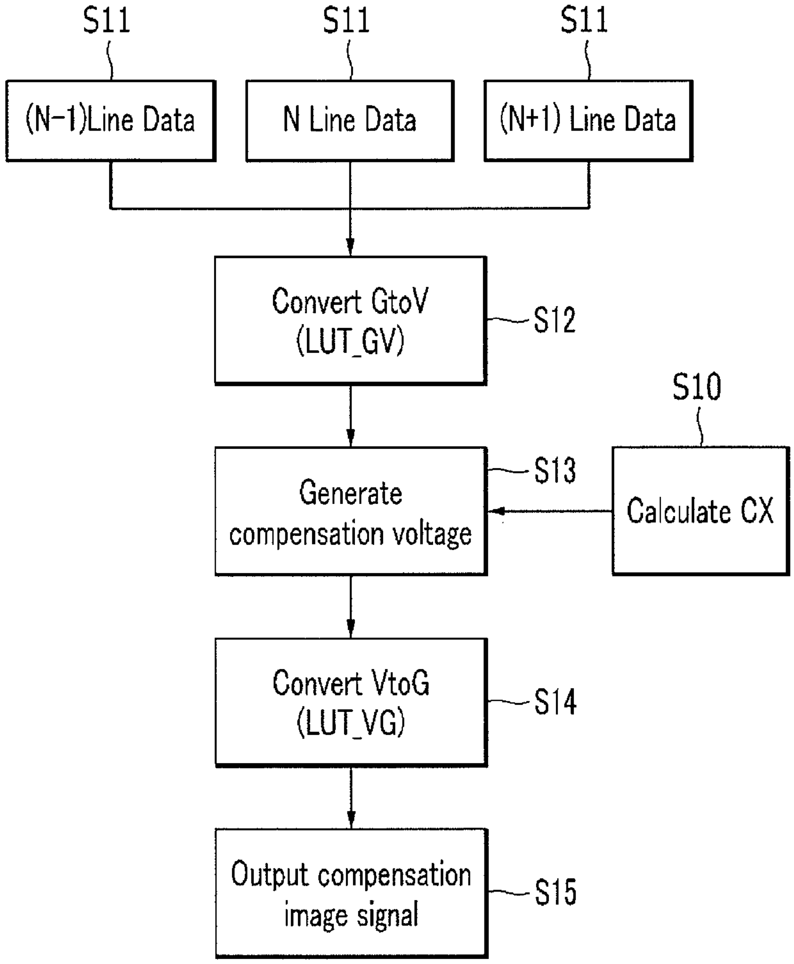
FIG. 16 is a flow chart illustrating a method of compensating for an input image signal in the display device according to an exemplary embodiment.

FIG. 14 is a block diagram of a signal compensator of the display device according to an exemplary embodiment, FIG. 15 is a diagram illustrating a lookup table included in a GV converter and a VG converter illustrated in FIG. 14, and FIG. 16 is a flow chart illustrating a method of compensating for an input image signal in the display device according to an exemplary embodiment.

Referring to FIG. 14, the signal processor 650 may include a memory 651, a GV converter 655, a compensation voltage generator 656, a coupling index CX calculator 652, and a VG converter 657.

The descriptions of the memory 651 and the coupling index CX calculator 652 are the same as those described in the above-mentioned exemplary embodiment and therefore the same descriptions thereof will be omitted.

The memory 651 may transfer the stored data of the input image signal IDAT of the (N−1)-th row and the stored data of the input image signal IDAT of the N-th row to the GV converter 655.

The GV converter 655 receives the data of the input image signal IDAT of the (N−1)-th row and the data of the input image signal IDAT of the N-th row from the memory 651, receives the data of the input image signal IDAT of the (N+1)-th row input from a source external to the signal controller 600, and converts the gray G of the data into a voltage V. This is briefly referred to as a GV conversion.

For the GV conversion, the GV converter 655 may include a conversion lookup table. The conversion lookup table is a one-dimensional lookup table and may be defined depending on a function between the data voltage applied to the display panel 300 and the gray. The function between the data voltage and the gray may vary depending on the characteristics of the display panel 300, for example, depending on a voltage-luminance graph (VT curve) or a gamma characteristic of a liquid crystal in the case of an LCD.

FIG. 15 illustrates an example of the conversion lookup table which is included in the GV converter 655. Referring to FIG. 15, the data voltage for each gray may be stored one-dimensionally when the entire gray is present, for example, from 0 gray to 255 gray. In this case, the data voltage may include a positive-polarity voltage and a negative-polarity voltage depending on the inversion driving.

Referring again to FIG. 14, the compensation voltage generator 656 receives the converted voltage from the GV converter 655 and receives the coupling index CX calculated by the coupling index calculator 652 to generate the com pensation voltage. The compensation voltage Vt may be calculated by, for example, using Equations 2 and 3.

$$Vt=V(N)-CX\times(V\ N-1)-V(N))(\text{when } CX>0) \quad \text{Equation 2}$$

$$Vt=V(N)-CX\times(V(N+1))-V(N))(\text{when } CX>0) \quad \text{Equation 3}$$

In the above Equations 2 and 3, V(N) is the voltage V obtained by converting the input image signal IDAT of the N-th row, V(N−1) is the voltage V obtained by converting the input image signal IDAT of the (N−1)-th row, and V(N+1) is the voltage V obtained by converting the input image signal IDAT of the (N+1)-th row. Since the ghosting phenomenon may occur when the coupling index CX is a positive number, the compensation voltage Vt may be calculated depending on the above Equation 2 and since the shading phenomenon may occur when the coupling index CX is a negative number, the compensation voltage Vt may be calculated depending on the above Equation 3.

The VG converter 657 receives the compensation voltage Vt from the compensation voltage generator 656 and converts the received compensation voltage Vt into the gray G. This is briefly referred to as the VG conversion.

For the VG conversion, the VG converter 657 may include the conversion lookup table and the conversion lookup table may be the same as the lookup table which is included in the GV converter 655 as illustrated in FIG. 15.

The VG converter 657 may output the converted gray V as the compensated image signal IDAT'.

According to an exemplary embodiment, the GV converter 655, the compensation voltage generator 656, and the VG converter 657 correspond to the signal compensator 654 of FIG. 3.

Next, the operation of the signal processor 650 illustrated in FIGS. 14 and 15 will be described with reference to FIG. 16.

First, the coupling index calculator 652 calculates the coupling index CX for the corresponding pixel PX (S10).

Next, the GV converter 655 receives the data of the input image signal IDAT of the (N−1)-th row and the data of the input image signal IDAT of the N-th-row from the memory 651 and receives the data of the input image signal IDAT of the (N+1)-th row from the an external source (S11).

Next, the GV converter 655 converts the gray G of the received data into the voltage V depending on the conversion lookup table LUT_GV (S12).

Next, the compensation voltage generator 656 receives the voltage converted by the GV converter 655 and receives the coupling index CX calculated by the coupling index calculator 652 to generate the compensation voltage Vt (S13).

Next, the VG converter 657 receives the compensation voltage Vt from the compensation voltage generator 656 and converts the received compensation voltage Vt into the gray G based on the conversion lookup table LUT_VG (S14). In this case, the conversion lookup table LUT_VG may be the same as the conversion lookup table LUT_GV of the GV converter 655.

Next, the gray G converted by the VG converter 657 is output as the compensated image signal IDAT' (S15).

While the described technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:

a display panel including a plurality of pixels arranged in rows, a plurality of data lines, and a plurality of gate lines;

a data driver configured to apply a plurality of data voltages to the data lines;

a gate driver configured to apply a plurality of gate signals to the gate lines; and a signal controller including a signal processor, wherein the signal controller is configured to control the data driver and the gate driver, wherein the signal processor includes:

a memory storing: i) an input image signal of the (N−1)-th row and ii) an input image signal of the N-th row, wherein N is a natural number of 2 or more; and a coupling index calculator configured to calculate a coupling index which represents a degree of coupling between adjacent rows, and wherein the signal processor is configured to compensate for the input image signal of a pixel of the N-th row to generate a compensated image signal based at least in part on: i) an input image signal of the (N+1)-th row, ii) the input image signal of the (N−1)-th row, iii) the input image signal of the N-th row, and iv) the calculated coupling index, and wherein the coupling index calculator is further configured to calculate the coupling index based at least in part on a distance from the data driver to the pixel and a distance from the gate driver to the pixel.

2. The display device of claim 1, wherein the coupling index calculator is further configured to calculate the coupling index based at least in part on a function which depends on characteristics of the display panel.

3. The display device of claim 1, wherein the signal processor further includes a three-dimensional lookup table memory which includes a plurality of lookup tables each configured to store compensation values according to the coupling index.

4. The display device of claim 3, wherein the three-dimensional lookup table memory further includes:

a first lookup table corresponding to a positive coupling index and storing compensation values based at least in part on values of: i) the input image signal of the (N−1)-th row and ii) the input image signal of the N-th row, and a second lookup table corresponding to a negative coupling index and storing compensation values based at least in part on values of: i) the input image signal of the (N+1)-th row and ii) the input image signal of the N-th row.

5. The display device of claim 3, wherein the signal processor further includes a signal compensator configured to: i) receive a compensation value from the three-dimensional lookup table memory and ii) generate the compensated image signal based at least in part on the received compensation value.

6. A display device comprising:

a display panel a plurality of pixels arranged in rows, a plurality of data lines, and a plurality of gate lines;

a data driver configured to apply a plurality of data voltages to the data lines;

a gate driver configured to apply a plurality of gate signals to the gate lines; and a signal controller including a signal processor, wherein the signal controller is configured to control the data driver and the gate driver, wherein the signal processor includes:

a memory: i) an input image signal of the (N−1)-th row and ii) an input image signal of the N-th row, wherein N is a natural number of 2 or more; and a coupling index calculator configured to calculate a coupling index which represents a degree of coupling between adjacent rows, and wherein the signal processor is configured to compensate for the input image signal of a pixel of the N-th row to generate a compensated image signal based at least in part on: i) an input image signal of the (N+1), the input image signal of the (N−1)-th row, iii) the input image signal of the N-th row, and iv) the calculated coupling index, and wherein the signal processor further includes:

a gray-to-voltage (GV) converter configured to convert into voltages: i) the input image signal of the (N−1)-th row, ii) the input image signal of the N-th row, and iii) the input image signal of the (N+1)-th row;

a compensation voltage generator configured to: i) receive the converted voltages from the GV converter, ii) receive the coupling index from the coupling index calculator, and iii) generate a compensation voltage based at least in part on the converted voltages and the coupling index; and a voltage-to-gray (VG) converter configured to: i) receive the compensation voltage and ii) convert the compensation voltage into a gray value.

7. The display device of claim 6, wherein the GV converter includes a conversion lookup table storing conversion values which have a functional relationship between the data voltages and gray values.

8. The display device of claim 7, wherein the VG converter is further configured to convert the compensation voltage into the gray value based at least in part on conversion values.

9. The display device of claim 6, wherein the compensation voltage generator is further configured to generate the compensation voltage Vt based at least in part on the following equations:

$$Vt=V(N)-CX\times(V\,N-1)-V(N))(\text{when } CX>0) \text{ and}$$

$$Vt=V(N)-CX\times(V(N+1))-V(N))(\text{when } CX>0),$$

wherein Vt is the compensation voltage, CX is the coupling index, V(N) is a voltage obtained by converting the input image signal of the N-th row, V(N−1) is a voltage obtained by converting the input image signal of the (N−1)-th row, and V(N+1) is a voltage obtained by converting the input image signal of the (N+1)-th row.

10. A method of driving a display device including pixels arranged in rows, comprising:

storing an input image signal of the (N−1)-th row and an input image signal of the N-th row, wherein N is a natural number of 2 or more;

calculating a coupling index which represents a degree of coupling between adjacent rows; and compensating for the input image signal of a pixel of the N-th row to generate a compensated image signal based at least in part on: i) an input image signal of the (N+1)-th row, ii) the input image signal of the (N−1)-th row, and iii) the input image signal of the N-th row, and iv) the calculated coupling index, wherein the display device further includes a data driver and a gate driver, and wherein the calculating is performed based at least in part on the distance from the data driver to the pixel and the distance from the gate driver to the pixel.

11. The method of claim 10, wherein the display device further includes a display panel and wherein the calculating is performed based at least in part on a function which depends on characteristics of the display panel.

12. The method of claim 10, wherein the display device further includes a three-dimensional lookup table memory including a plurality of lookup tables each storing compensation values according to the coupling index and wherein the compensating includes using the compensation values.

13. The method of claim 12, wherein the three-dimensional lookup table memory includes:

a first lookup table corresponding to a positive coupling index and storing compensation values based at least in part on values of: i) the input image signal of the (N−1)-th row and ii) the input image signal of the N-th row, and a second lookup table corresponding to a negative coupling index and storing compensation values based at least in part on values of: i) the input image signal of the (N+1)-th row and ii) the input image signal of the N-th row.

14. The method of claim 12, wherein the compensating includes: i) receiving the compensation values from the three-dimensional lookup table memory and ii) generating the compensated image data based at least in part on the compensation values.

15. A method of driving a display device including pixels arranged in rows, comprising:

storing an input image signal of the (N−1)-th row and an input image signal of the N-th row, wherein N is a natural number of 2 or more;

calculating a coupling index which represents a degree of coupling between adjacent rows; and compensating for the input image signal of a pixel of the N-th row to generate a compensated image signal based at least in part on: i) an input image signal of the (N+1)-th row, ii) the input image signal of the (N−1)-th row, and iii) the input image signal of the N-th row, and iv) the calculated coupling index, wherein the compensating includes:

converting into voltages: i) the input image signal of the (N−1)-th row, ii) the input image signal of the N-th row, and iii) the input image signal of the (N+1)-th row;

generating a compensation voltage based at least in part on the converted voltages and the coupling index; and converting the compensation voltage into a gray.

16. The method of claim 15, wherein the display device includes a conversion lookup table storing conversion values which have a functional relationship between the data voltages and grays and wherein the converting of the input image signals into the voltages is performed based at least in part on the conversion values.

17. The method of claim 16, wherein the converting of the compensation voltage into the gray is performed based at least in part on the conversion values.

18. The method of claim 15, wherein the generating of the compensation voltage is performed based at least in part on the following equations:

$$Vt=V(N)-CX\times(V\,N-1)-V(N))(\text{when } CX>0) \text{ and}$$

$$Vt=V(N)-CX\times(V(N+1))-V(N))(\text{when } CX>0)$$

wherein Vt is the compensation voltage, CX is the coupling index, V(N) is a voltage obtained by converting the input image signal of the N-th row, V(N−1) is a voltage obtained by converting the input image signal of the (N−1)-th row, and V(N+1) is a voltage obtained by converting the input image signal of the (N+1)-th row.

* * * * *